United States Patent
Xu et al.

(10) Patent No.: US 9,817,769 B1
(45) Date of Patent: *Nov. 14, 2017

(54) METHODS AND APPARATUS FOR IMPROVED ACCESS TO SHARED MEMORY

(71) Applicant: Juniper Networks, Inc., Sunnyvale, CA (US)

(72) Inventors: Xiangwen Xu, Saratoga, CA (US); Hexin Wang, Los Altos, CA (US); Xiang Zhu, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,756

(22) Filed: Apr. 10, 2017

Related U.S. Application Data

(63) Continuation of application No. 12/544,628, filed on Aug. 20, 2009, now Pat. No. 9,619,398.

(51) Int. Cl.
*G06F 12/10* (2016.01)

(52) U.S. Cl.
CPC .......... *G06F 12/10* (2013.01); *G06F 2212/65* (2013.01); *G06F 2212/657* (2013.01); *G06F 2212/68* (2013.01)

(58) Field of Classification Search
CPC .......... G06F 2212/657; G06F 2212/68; G06F 12/10; G06F 2212/65
See application file for complete search history.

(56) References Cited

U.S. PATENT DOCUMENTS

| | | | |
|---|---|---|---|
| 4,215,402 | A | 7/1980 | Mitchell et al. |
| 6,230,248 | B1 | 5/2001 | Burger et al. |
| 6,266,705 | B1 | 7/2001 | Ullum et al. |
| 6,598,050 | B1 | 7/2003 | Bourekas |

(Continued)

OTHER PUBLICATIONS

Devadas, "Virtual Memory and Paging (Pretending that your PC has a GigaByte of Memory)," slideshow, [online] Retrieved from the Internet: <URL: http://6004.csail.mit.edu/Spring98/Lectures/lect19/sld015.htm>, Apr. 16, 1998, 21 pgs.

(Continued)

*Primary Examiner* — Reginald Bragdon
*Assistant Examiner* — Thanh Vo
(74) *Attorney, Agent, or Firm* — Cooley LLP

(57) ABSTRACT

In one embodiment, a method includes receive a translation vector, selecting a translation entry from a plurality of translation entries, and determining whether the translation entry is associated with a first identifier class or a second identifier class. The translation vector includes a first identifier, a second identifier, and a virtual memory identifier. The first identifier is associated with a first identifier class, and the second identifier is associated with a second identifier class. The translation vector is received from a translation module including a memory configured to store the plurality of translation entries. Each translation entry from the plurality of translation entries including a virtual memory identifier. The translation entry is selected from the plurality of translation entries of the translation module based on the virtual memory identifier of the translation vector. The determining whether the translation entry is associated with the first identifier class or the second identifier class is based on a shared indicator associated with the translation entry.

20 Claims, 7 Drawing Sheets

400

| | | | | | |
|---|---|---|---|---|---|
| 410 ↘ Virtual Memory Identifier 411 | Access ID 412 | Access ID 413 | Attributes 414 | Physical Memory Identifier 415 | Shared 416 |
| 420 ↘ Virtual Memory Identifier 421 | Access ID 422 | Access ID 423 | Attributes 424 | Physical Memory Identifier 425 | Shared 426 |
| ... | ... | ... | ... | ... | ... |
| 490 ↘ Virtual Memory Identifier 491 | Access ID 492 | Access ID 493 | Attributes 494 | Physical Memory Identifier 495 | Shared 496 |

(56) References Cited

U.S. PATENT DOCUMENTS

| | | |
|---|---|---|
| 6,839,313 B2 | 1/2005 | Araki et al. |
| 7,194,597 B2 | 3/2007 | Willis et al. |
| 7,409,487 B1 | 8/2008 | Chen et al. |
| 2003/0115402 A1 | 6/2003 | Dahlgren et al. |
| 2005/0044340 A1 | 2/2005 | Sheets et al. |
| 2005/0160132 A1 | 7/2005 | Van Doren et al. |
| 2006/0041882 A1 | 2/2006 | Shah |

OTHER PUBLICATIONS

Alisdair (website user), The Everything Development Company "Translation Look-Aside Buffer" [online] [retrieved on Jun. 10, 2009] Retrieved from the Internet: <URL: http://everything2.com/title/Translation%2520Look-Aside%2520Buffer>, 3 pgs.

Wikipedia, "Translation lookaside buffer" [online] [retrieved on Jun. 10, 2009] Retrieved from the Internet: <URL: http://en.wikipedia.org/wiki/Translation_lookaside_buffer>, 4 pgs.

300

| Virtual Memory Identifier 311 | Access ID 312 | Attributes 314 | Physical Memory Identifier 315 | Shared 316 |
|---|---|---|---|---|
| Virtual Memory Identifier 321 | Access ID 322 | Attributes 324 | Physical Memory Identifier 325 | Shared 326 |
| ... | ... | ... | ... | ... |
| Virtual Memory Identifier 391 | Access ID 392 | Attributes 394 | Physical Memory Identifier 395 | Shared 396 |

| Virtual Memory Identifier 411 | Access ID 412 | Access ID 413 | Attributes 414 | Physical Memory Identifier 415 | Shared 416 |
|---|---|---|---|---|---|
| Virtual Memory Identifier 421 | Access ID 422 | Access ID 423 | Attributes 424 | Physical Memory Identifier 425 | Shared 426 |
| ... | ... | ... | ... | ... | ... |
| Virtual Memory Identifier 491 | Access ID 492 | Access ID 493 | Attributes 494 | Physical Memory Identifier 495 | Shared 496 |

FIG. 4

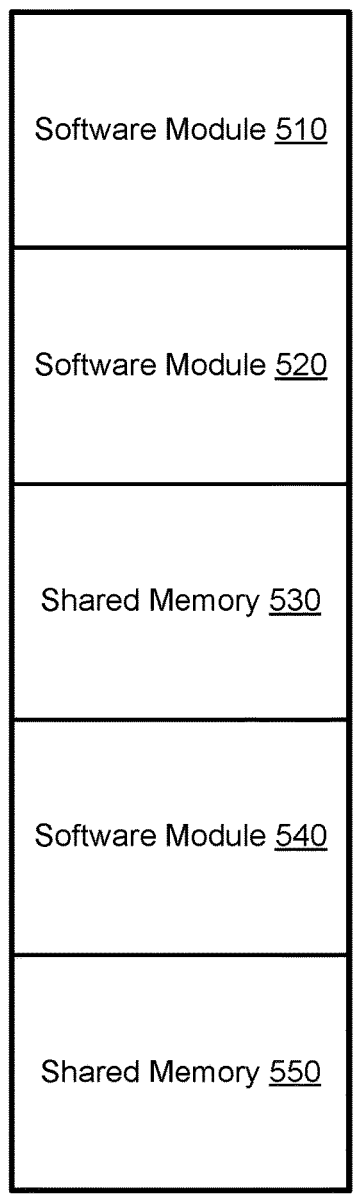
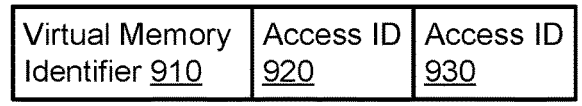
FIG. 9
FIG. 5

METHODS AND APPARATUS FOR IMPROVED ACCESS TO SHARED MEMORY

CROSS-REFERENCE TO RELATED APPLICATION

This application is a continuation of U.S. patent application Ser. No. 12/544,628 filed Aug. 20, 2009, entitled "METHODS AND APPARATUS FOR IMPROVED ACCESS TO SHARED MEMORY" (U.S. Pat. No. 9,619, 398), the contents of which are incorporated herein by reference.

BACKGROUND

One or more embodiments relate generally to methods and apparatus for accessing and managing shared memory within computing devices. More specifically, for example, one or more embodiments relate to providing access to shared portions of one or more memories based on one or more group identifiers within a translation lookaside buffer.

Computing devices and operating systems managing computing devices can provide software modules, or processes, executing at the computing devices with shared portions of memory using a variety of techniques. Some computing devices use processors and/or translation lookaside buffers ("TLBs") that can associate a list of process identifiers with a portion of memory (i.e., the shared memory). Any process with a process identifier that is included in the list of process identifiers can access (e.g., read and/or write to) the related portion of memory. Other computing devices use processors and/or TLBs that can be configured to ignore or disable a process identifier verification. When the process identifier verification is disabled, any process requesting access to the shared memory can access the shared memory regardless of the process identifier of that process.

Such methods and computing devices suffer several disadvantages. Because of limitations on memory within processors and TLBs, the number of process identifiers that can be stored in a list is generally small, for example, in comparison with the number of processes executing at a computing device. Additionally, a disabled process identifier verification creates a security vulnerability within the operating system and/or computing device allowing less restricted access to the shared memory. Thus, improved methods and apparatus for shared memory are desirable.

SUMMARY

In one embodiment, a method includes receive a translation vector, selecting a translation entry from a plurality of translation entries, and determining whether the translation entry is associated with a first identifier class or a second identifier class. The translation vector includes a first identifier, a second identifier, and a virtual memory identifier. The first identifier is associated with a first identifier class, and the second identifier is associated with a second identifier class. The translation vector is received from a translation module including a memory configured to store the plurality of translation entries. Each translation entry from the plurality of translation entries including a virtual memory identifier. The translation entry is selected from the plurality of translation entries of the translation module based on the virtual memory identifier of the translation vector. The determining whether the translation entry is associated with the first identifier class or the second identifier class is based on a shared indicator associated with the translation entry.

BRIEF DESCRIPTION OF THE DRAWINGS

FIG. 3 is an illustration of a table including translation entries at a translation module, according to an embodiment.

FIG. 4 is an illustration of a table including translation entries at a translation module, according to another embodiment.

FIG. 5 is an illustration of a memory provisioned for shared access by a group of software modules, according to an embodiment.

FIG. 9 is an illustration of a translation vector, according to an embodiment.

DETAILED DESCRIPTION

Figure 1:
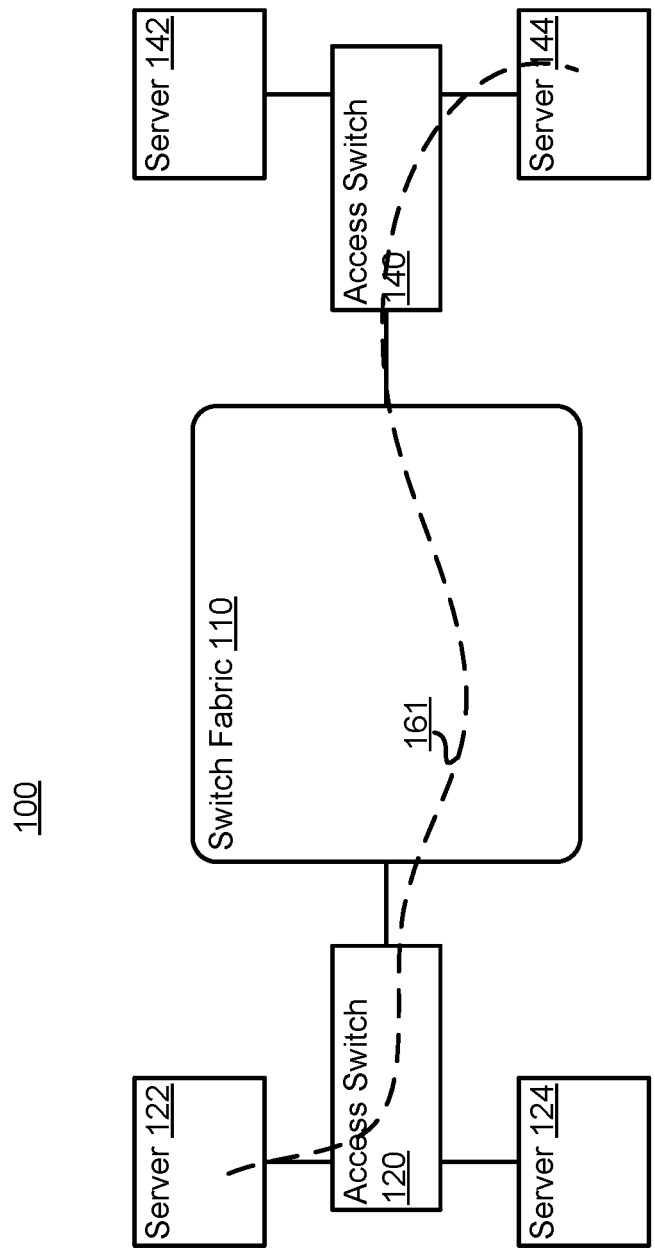
FIG. 1 is a system block diagram of a network including a switch fabric, according to an embodiment.

One or more embodiments can provide access to memory that is shared by or accessible to a group of software modules and/or hardware modules. For example, an operating system configured to manage hardware (e.g., device controllers, network interfaces, memory, and other hardware modules) and software (e.g., software modules such as drivers, application software, and other processes and threads) can provide the hardware and software with access to shared memory. In other words, although hardware modules and software modules generally have exclusive access to the portions of memory they access, the operating system can allow more than one hardware module or software module to access data at a single portion of memory.

In one embodiment, an operating system can define a group identifier that is associated with or assigned to each hardware module and software module that is configured to access a shared portion of memory. The group identifier is associated with the shared portion of the memory, and then used to authenticate or authorize software modules and hardware modules that attempt to access the shared portion of the memory. Said differently, when a software module (or hardware module) attempts to access the shared portion of the memory, that software module provides a group identifier associated with a group of software modules including that software module to the operating system. The operating system determines whether the group identifier provided by the software module matches the group identifier associated with the shared portion of the memory. If the group identifiers match, the software module is provided with access to the shared portion of the memory. If the group identifiers do not match, an error is generated to indicate that the software module is not allowed or authorized to access the shared memory. In other words, if the group identifier of the software module does not match the group identifier of the shared portion of the memory, the software module is not authenticated with the shared portion of the memory, and access to the shared portion of the memory is denied to the software module.

Because the group identifier is associated with each software module or hardware module authorized to access the shared portion of the memory, the operating system can manage a single identifier (or key) for the shared portion of the memory, rather than maintain a list or array of process identifiers of software modules and/or hardware modules, or other information related to the software modules and/or hardware modules that are authorized to access the shared portion of the memory. Such an approach can greatly lower the memory and processing overhead generally incurred to share portions of a memory among software modules and/or hardware modules. The reduced memory and processing overhead can be particularly beneficial within low-latency and/or high-throughput computing devices such as, for example, computing devices within a switch fabric of a data center. It can be desirable that such computing devices realize a switch fabric or data center that can transmit data at rates of giga-, tera-, and petabits (or greater) per second, with very low latency. Processing time spent searching an array or B-tree, or performing a lookup in a hash table to determine whether a particular software module (based on an associated process identifier) is authorized to access a shared portion of a memory is undesirable and can cause the switch fabric and/or data center to fall below desired performance standards or miss transmission deadlines. Thus, methods and apparatus related to improved access to shared memory can improve the efficiency of computing devices and the systems (e.g., data centers, switch fabrics, and other systems) that include such computing devices.

As used in this specification, the singular forms "a," "an" and "the" include plural referents unless the context clearly dictates otherwise. Thus, for example, the term "a software module" is intended to mean a single software module or multiple software modules; and "memory" is intended to mean one or more memories, or a combination thereof.

FIG. 1 is a system block diagram of network 100 including switch fabric 110, according to an embodiment. As illustrated in FIG. 1, network 100 includes switch fabric 110, access switch 120, access switch 140, server 122, server 124, server 142, and server 144. Switch fabric 110 is operatively coupled to access switch 120 and access switch 140. Server 122 and server 124 are operatively coupled to switch fabric 110 via access switch 120. Server 142 and server 144 are operatively coupled to switch fabric 110 via access switch 140.

Network 100 is configured such that servers 122, 124, 142, and 144 can communicate one with another via access switch 120, access switch 140 and switch fabric 110. For example, as illustrated by data path 161, server 122 can send a data packet addressed to server 144 to access switch 120. Access switch 120 can forward the data packet to access switch 140 via switch fabric 110. Access switch 140 can then forward the data packet to server 144. In some embodiments, access switches 120 and access switch 140 are configured to classify data packets received from servers 122 and 124, and servers 142 and 144, respectively.

Switch fabric 110 can include multiple stages and can be referred to as a multi-stage switch fabric. Additionally, switch fabric 110 can include various elements or computing devices such as ingress and egress ports and/or queues, input and output modules, packet classification modules, routing engines or modules, switch controllers, and/or other elements configured to manage or control switch fabric 110 and/or data transmitted via (or through) switch fabric 110. Such elements can be implemented as software modules hosted at one or more processor and resident within (or stored at) a memory operatively coupled to the one or more processors. Alternatively, such elements can be implemented as hardware modules such as application-specific integrated circuits ("ASICs") and/or field-programmable gate arrays ("FPGAs"). In some embodiments, such elements can be implemented as both software modules and hardware modules.

Switch fabric 110 can include a data plane in which data signals (e.g., data packets sent between servers 122 and 124 and servers 142 and 144) are transmitted through switch fabric 110 and a control plane in which control signals (e.g., routing information related to data signals and state information related to one or more stages or elements of switch fabric 110) are transmitted within switch fabric 110.

In some embodiments, servers 122 and 124, servers 142 and 144 communicate with access switches 120 and 140, respectively, via one protocol and access switches 120 and 140 can communicate with switch fabric 110 via another protocol. For example, servers 122 and 124, and 142 and 144 can communicate with access switches 120 and 140, respectively, via an Ethernet protocol; access switches 120 and 140 can communicate with switch fabric 110 via a cell-based switching protocol (e.g., using fixed-length or variable-length cell switching). In other words, in some embodiments access switches 120 and 140 can operate as gateways between servers and/or other devices (e.g., network attached storage devices or storage area network devices) communicating via one protocol in a network and with switch fabric 110 communicating via another protocol. In some embodiments, one or more of access switches 120 and 140 can be elements (or part) of switch fabric 110 and can be referred to as edge devices (or elements) of switch fabric 110.

In some embodiments, access switches 120 and 140 are configured to classify data packets received by server 122 and 124, and servers 142 and 144, respectively, before forwarding the data packets to determine whether any processing is appropriate for the data packets. For example, access switches 120 and 140 can include a packet classification module configured to classify data packets received by access switches 120 and 140 from servers 122 and 124 and severs 142 and 144, respectively. In some embodiments, data packet classification can include determining whether a portion of a data packet satisfies a condition included in a policy such as, for example, a firewall policy, a routing policy, and/or an access control list ("ACL"). In some embodiments, a processing action (also referred to herein as an action) can be related to a condition in the policy, and access switches 120 and 140 are configured to execute (or perform) that action if the related condition is satisfied during packet classification. Actions can include, for example, modifying one or more parameters of a data packet, accessing a database (not shown) to determine routing information related to a data packet and/or destination of a data packet, dropping a packet, and/or other actions relative to the data packet.

In some embodiments, multiple actions can be related to a single condition. For example, if a condition is satisfied, access switch 120 can modify a time-to-live ("TTL") value in a data packet received from server 122 and can access a database to determine routing information related to or associated with the data packet. In some embodiments, an action can be dependent on another action defining a condition. Said differently, an action can be executed in response to a condition being satisfied by a data packet during packet classification, and that action can define a secondary (or supplemental) classification condition. If the secondary classification condition is satisfied, another action is executed. For example, a data packet received by access switch 140 from server 144 can be classified based on a condition (referred to as a primary classification condition, or primary condition) defining a longest prefix match of a destination Internet Protocol ("IP") address of the packet. Access switch 140 can execute an action triggered by the primary condition where that action defines an additional, supplemental, or secondary classification condition (or secondary condition) such as a match of Transmission Control Protocol ("TCP") flags in the data packet. Access switch 140 can further classify the data packet based on that secondary condition. In other words, if the TCP flags in the data packet satisfy the secondary condition defined in the action, access switch 140 can execute another action relative to the data packet. Thus, the result or outcome of packet classification with a primary classification condition can invoke or trigger packet classification with a secondary classification condition.

In some embodiments, computing devices such as, for example, elements of switch fabric 110, servers 122, 124, 142 and/or 144, and/or other devices can share memory. For example, two or more computing devices can share one or more portions of a memory, and/or two or more software modules (e.g., processes, threads, contexts, or applications) or hardware modules within a computing device can share one or more portions of a memory. In other words, one or more software modules and/or hardware modules can access a portion of a memory. For example, a routing engine and a classification module within switch fabric 110 can both access a data packet or cell stored at a single portion of a memory. Thus, the data packet can be stored at one memory and accessed by multiple elements of switch fabric 110.

For example, FIG. 5 is an illustration of memory 500 provisioned for shared access by a group of software modules, according to an embodiment. Memory 500 includes software module 510, software module 520, and software module 540. Additionally, memory 500 includes shared memory portion 530 and shared memory portion 550. Software modules 510, 520 and 540 can include executable instructions and/or program data such as variables, constants, and/or other values or data. Similarly, shared memory portions 530 and 550 can include executable instructions and/or program data such as variables, constants, and/or other values or data.

Software modules 510, 520 and 540 (or the portions of memory 500 allocated or provisioned for software modules 510, 520 and 540), are uniquely accessible to the respective software modules 510, 520 and 540. In other words, the portions of memory 500 associated with each of software modules 510, 520 and 540 are accessible to software modules 510, 520 and 540, respectively, but not to other software modules. Said differently, the portions of memory 500 provisioned for software modules 510, 520 and 540 are associated with a process access class (e.g., a single software module or process can access these portions of memory 500). Said yet another way, each of software modules 510, 520 and 540, when executing at a processor, can access a portion of memory 500 that is uniquely associated with that software module and includes operating instructions or code related to that software module.

Shared memory portions 520 and 550 are accessible to more than one software module or process. For example, software modules 510 and 520 can access (e.g., read from, write to, and/or execute instructions stored at) shared memory 530; and software modules 510 and 540 can access shared memory 550. In some embodiments, software modules configured to access a shared portion of memory 500 can be assigned a common group identifier, and that group identifier can be associated with an access identifier of that shared portion of memory 500. Thus, an operating system, memory management module (e.g., a hardware module configured to manage memory 500), and/or translation module can determine whether a software module is authorized or allowed to access a portion of memory 500 based on a group identifier of that software module and an access identifier of that portion of memory 500. Similarly, the portions of memory 500 configured for access by a single software module can have an access identifier associated with a process identifier of that software module, and an operating system, memory management module, and/or translation module can determine whether a software module is authorized to access that portion of memory 500 based on a process identifier of that software module and an access identifier of that portion of memory 500.

Figure 2:
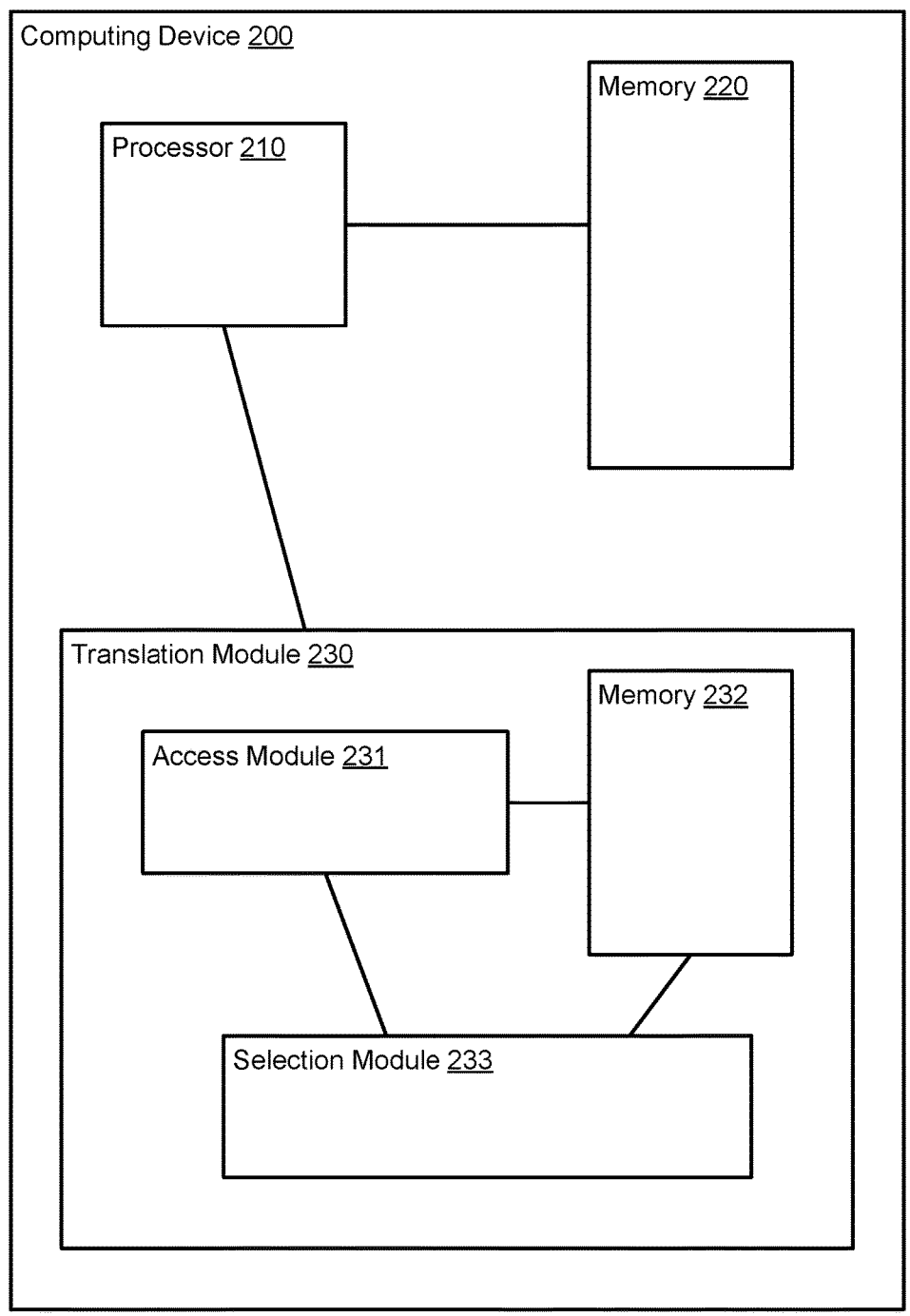
FIG. 2 is a schematic block diagram of a computing device including a translation module, according to an embodiment.

FIG. 2 is a schematic block diagram of computing device 200, such as an element of switch fabric 110, including translation module 230, according to an embodiment. Computing device 200 includes processor 210, memory 220, and translation module 230. Processor 210 is operatively coupled to memory 220 and translation module 230, and is configured to communicate with translation module 230 and memory 220.

Processor 210 can be configured to host a group of software modules (or processes) that are stored at memory 220. In some embodiments, one or more portions of the software modules can be stored at memory 220, and one or more portions of the software modules can be stored at another memory (not shown) such as a non-volatile memory (e.g., hard disk drive, solid-state drive, or database). Additionally, data or information related to the software modules can be stored at memory 220 and/or another memory (not shown) such as a non-volatile memory (e.g., hard disk drive, solid-state drive, or database).

In some embodiments, the software modules can request access to memory 220 (or data stored at memory locations of memory 220) via virtual memory identifiers. Virtual memory identifiers can be, for example, virtual memory addresses related to each software module. Processor 210 can be configured to translate virtual memory identifiers to physical memory identifiers such that process 210 can access memory locations and/or data stored at memory locations of memory 220. As illustrated in FIG. 2, processor 210 can communicate with translation module 230 to translate virtual memory identifiers into physical memory identifiers (e.g., a memory location or address within memory 220 that is related to a particular virtual memory identifier). In some embodiments, translation module 230 can be a portion of processor 210. In other words, translation module 230 can be a module or sub-module of processor 210.

Translation module 230 is configured to receive a translation vector from processor 210, and provide a physical memory identifier related to (or associated with) a virtual memory identifier included in the translation vector. As illustrated in FIG. 9, translation vector 900 includes virtual memory identifier 910 for which a physical memory identifier is requested by processor 210, access identifier (labeled "Access ID") 920 associated with the process (or software module) at processor 210 for which the physical memory identifier is requested, access identifier (labeled "Access ID") 930 associated with a group of processes among which a portion of memory 220 is configured to be shared. In some embodiments, a translation vector 900 can include additional and/or other information. For example, in some embodiments a translation vector can include an indication of a type of access for which the physical memory identifier is requested such as a read indicator or a write indicator. In some embodiments, access identifier 920 which is associated with a process can be referred to as a process identifier, and access identifier 930 which is associated with a group of processes can be referred to as a group identifier. Access identifier 920 and/or access identifier 930 can be compared with an access identifier of a translation entry at translation module 230 to determine whether a software module and/or group of software modules can access a portion of a memory, as discussed in further detail herein.

As illustrated in FIG. 2, translation module 230 includes access module 231, memory 232, and selection module 233. In some embodiments, one or more portions or functionalities of access module 231 and selection module 233 can be included in the other of access module 231 and selection module 233. In other words, although functionalities and portions of access module 231 and selection module 233 are discussed separately, in some embodiments, access module 231 and selection module 233 can be combined within a single module. Alternatively, functionalities and portions of access module 231 and selection module 233 can be separated into more that two modules and/or included within processor 210. Similarly, in some embodiments, memory 232 can be a portion of memory 220. Thus, translation module 230 can be operatively coupled to memory 220.

Access module 231 can be configured to receive translation vectors from processor 210, and provide (e.g., send one or more signals associated with) a virtual memory identifier from the translation vectors to selection module 233. Selection module 233 can be configured to select a translation entry from a group of translation entries stored at memory 232 based on a virtual memory identifier provided by access module 231. A translation entry can be a portion of memory 232 including, for example, a virtual memory identifier and a related (or associated) physical memory identifier. In some embodiments, a translation entry can include additional fields or information such as an access identifier related to, for example, a process, a group of processes, or a group of groups of processes authorized or allowed to access a memory location identified (or referenced) by the physical memory identifier of the translation entry. In some embodiments, a translation entry can include an access type field including access permissions or restrictions. For example, a translation entry can specify that a memory location identified (or referenced) by the physical memory identifier of the translation entry is accessible exclusively for reading, executing or writing, or for both reading and writing, but not executing. In some embodiments, a translation entry can include a shared indicator that has one value if a memory location identified (or referenced) by the physical memory identifier of the translation entry is shared among a group of processes, and another value if that memory location is not shared among a group of processes. FIGS. 4 and 5 illustrate tables of translation entries that can be stored at a memory such as memory 232.

FIG. 3 is an illustration of table 300 including translation entries at a translation module, according to an embodiment. Table 300 can be, for example, stored at a memory accessible to a translation module. As illustrated in FIG. 3, table 300 includes translation entries 310, 320 and 390. Translation entry 310 includes virtual memory identifier 311, access identifier (labeled "Access ID") 312, attributes 314, physical memory identifier 315, and shared indicator (labeled "Shared") 316. Translation entry 320 includes virtual memory identifier 321, access identifier (labeled "Access ID") 322, attributes 324, physical memory identifier 325, and shared indicator (labeled "Shared") 326. Translation entry 390 includes virtual memory identifier 391, access identifier (labeled "Access ID") 392, attributes 394, physical memory identifier 395, and shared indicator (labeled "Shared") 396.

FIG. 4 is an illustration of table 400 including translation entries at a translation module, according to another embodiment. Table 400 can be, for example, stored at a memory accessible to a translation module. As illustrated in FIG. 4, table 400 includes translation entries 410, 420 and 490. Translation entry 410 includes virtual memory identifier 411, access identifier (labeled "Access ID") 412, access identifier (labeled "Access ID") 413, attributes 414, physical memory identifier 415, and shared indicator (labeled "Shared") 416. Translation entry 420 includes virtual memory identifier 421, access identifier (labeled "Access ID") 422, access identifier (labeled "Access ID") 423, attributes 424, physical memory identifier 425, and shared indicator (labeled "Shared") 426. Translation entry 490 includes virtual memory identifier 491, access identifier (labeled "Access ID") 492, access identifier (labeled "Access ID") 493, attributes 494, physical memory identifier 495, and shared indicator (labeled "Shared") 496.

A virtual memory identifier can be a virtual memory address that is used by one or more software modules and/or hardware modules to reference or access a memory location. An access identifier can be or include a value that is related to a process identifier or group identifier of one or more software modules and/or hardware modules.

Attributes can include various access parameters and or characteristics of a portion of memory or memory location referenced by a virtual memory identifier and/or a physical memory identifier. For example, attributes can include access type fields or values such as read, write, or execute values. In other words, attributes can specify or define what operations are allowed for a portion of memory and/or what operations are not allowed for a portion of memory. Attributes can also include, for example, fields or values related to whether a portion of a memory has been changed since an earlier synchronization routine or process (e.g., a flush to hard disk of a file), whether a portion of memory is allowed to be swapped to secondary memory storage such as a hard disk, and/or other characteristics of a portion of memory.

A physical memory identifier can be a physical memory address that references (or indexes) a memory location of data that is stored within primary memory storage such as a random-access memory ("RAM"). In other words, a physical memory identifier or physical memory address can identify a particular location or portion of physical memory in a computing device. A shared indicator can provide an indication that a portion of memory referenced by a physical memory identifier is shared among a group of software modules or is uniquely accessible to a single software module.

As illustrated in FIG. 4, a translation entry can include multiple access identifiers. For example, one access identifier can be associated with a process identifier and another access identifier can be associated with a group identifier. In some embodiments, one or all access identifiers can be used to determine whether a particular software module or hardware module is allowed or authorized for access (or a type of access) to a portion of a memory.

Referring now to FIG. 2, memory 232 can be any of a variety of memories. For example, memory 232 can be a content addressable memory ("CAM"), and selection module 233 can provide a virtual memory identifier to the CAM to determine whether the CAM includes a translation entry related to (or including) that virtual memory identifier. If a translation entry including that virtual memory identifier is located at the CAM (memory 232), selection module can provide an indication (e.g., a signal) to access module 231 that a translation entry including a physical memory location related to that virtual memory identifier is located within memory 232.

In some embodiments, selection module 233 can define a hash value based on a virtual memory identifier, and use that hash value to index (or reference) a translation entry stored at a memory location of memory 232. If a virtual memory identifier of that translation entry is related to (e.g., is the same as or matches) the virtual memory identifier included in the translation vector and provided by access module 231, selection module can provide an indication to access module 231 that a translation entry including a physical memory location related to that virtual memory identifier is located within memory 232. In some embodiments, the indication includes the translation entry. In some embodiments, the indication includes a reference to or some other access information related to the translation entry, and access module 231 can access the translation entry based on the reference.

Access module 231 can receive the indication from selection module 233, and access the translation entry to determine whether the process for which processor 210 requested the physical memory identifier is allowed (or authorized) to access the memory location identified (or referenced) by the physical memory identifier of the translation entry. For example, access module 231 can compare an access identifier of the translation entry with a process identifier and/or a group identifier included in the translation vector. If the process identifier and/or a group identifier included in the translation vector is related to (e.g., match) the access identifier of the translation vector, access module 231 can provide the physical memory identifier to processor 210. If the process identifier and/or a group identifier included in the translation vector is not related to (e.g., match) the access identifier of the translation vector, access module 231 can provide an error signal to processor 210. Similarly, if a translation entry related to a virtual memory identifier included in a translation vector is not stored at memory 232 (e.g., selection module 233 did not access a translation entry at 232), access module 231 can provide an error signal to processor 210. In some embodiments, access module 231 can determine whether a type of access requested (e.g., read, write, or execute) is allowed based on an access permission (e.g., within an access type field of the translation entry), and provide the physical memory identifier to processor 210 if the type of access is allowed. If the type of access requested is not permitted or allowed, an error signal can be provided to processor 210.

In some embodiments, access module 231 can determine whether the portion of memory 220 referenced by the physical memory identifier of a translation entry is related to a process class of memory access or a group class of memory access based on, for example, a shared indicator related to that translation entry. Access module 231 can then compare a group identifier or a process identifier from a translation vector with an access identifier from a translation entry based on the shared indicator to determine whether access to the portion of memory 220 referenced by the physical memory identifier of that translation entry is allowed or authorized. In other words, the translation entry can be related to a first access class (e.g., a group class of memory access) if the shared indicator has one value and to a second access class (e.g., a process class of memory access) if the shared indicator has another value. Said differently, access module 231 can compare an access identifier of a translation entry with a group identifier from a translation vector if a shared indicator of the translation entry has a first value, and can compare the access identifier of that translation entry with a process identifier from the translation vector if the shared indicator of that translation entry has a second value.

Processor 210 can receive a physical memory identifier from access module 231 of translation module 230 and access a memory location at memory 220 based on that physical memory identifier. In other words, a software module at processor 210, for which processor 210 requested the physical memory identifier based on a virtual memory identifier of the software module, can access (e.g., read, write, or execute) a memory location at memory 220 referenced by the physical memory identifier. Said differently, the virtual memory identifier is translated to a physical memory identifier, and a software module can access a memory location using that physical memory identifier.

Figure 6:
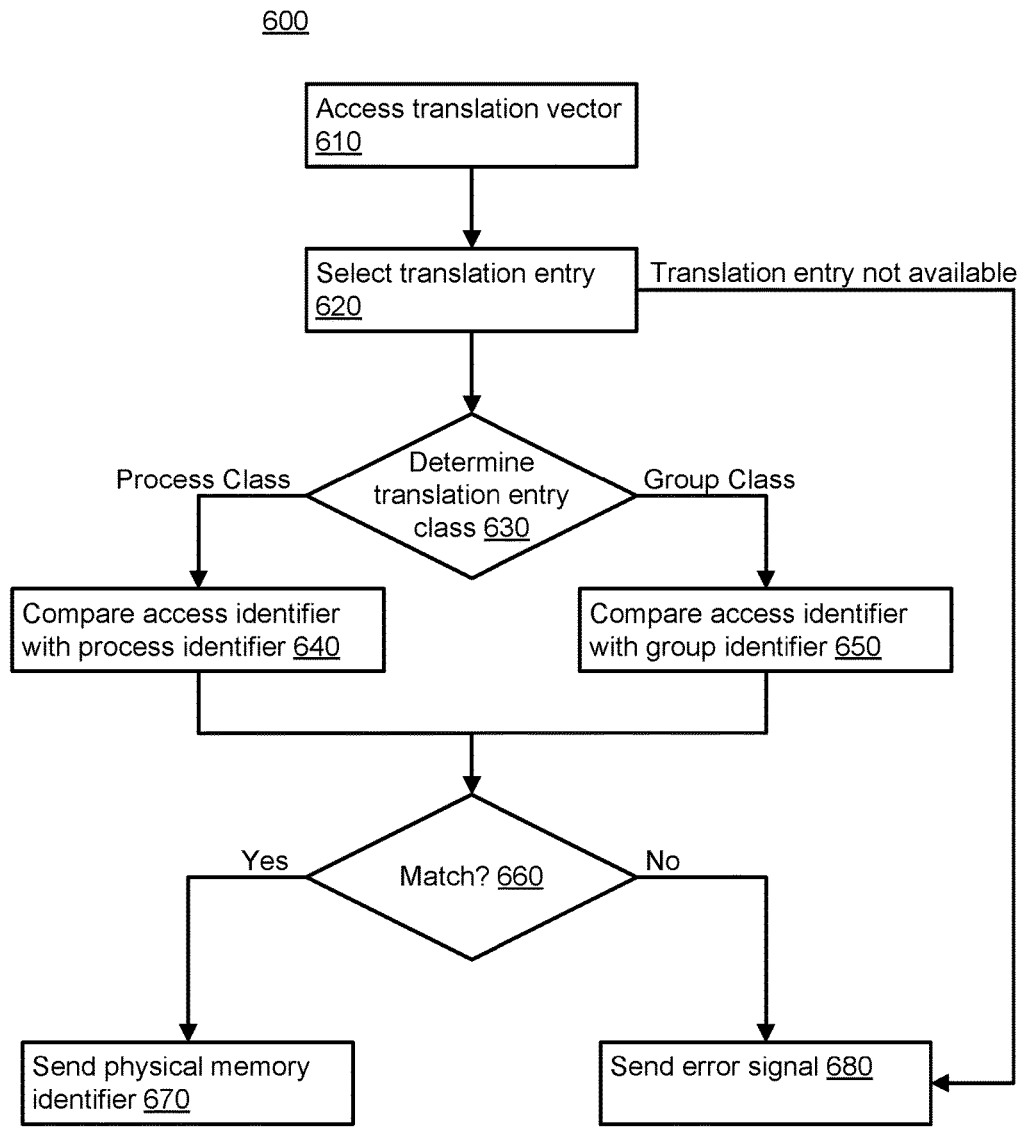
FIG. 6 is a flowchart of a process for accessing a physical memory identifier, according to an embodiment.

FIG. 6 is a flowchart of process 600 for accessing a physical memory identifier, according to an embodiment. The physical memory identifier can be used, for example, to access a portion of a memory such as a shared portion of a memory. Method 600 can be implemented, for example, as a software module (e.g., source code, object code, one or more scripts, or instructions) stored at a memory and operable to be executed and/or interpreted or compiled at a processor operatively coupled to the memory at a computing device. For example, processor-executable instructions stored at a memory of a computing device can be executed at a processor at the computing device to cause the processor to execute the steps of method 600. In some embodiments, method 600 can be implemented as one or more hardware modules such as, for example, an ASIC, an FPGA, a processor, or other hardware module at a computing device. In some embodiments, method 600 can be implemented as a combination of one or more hardware modules and software modules at a computing device.

A translation vector is accessed, at 610. The translation vector can include a virtual memory identifier, a group identifier, a process identifier, an access type indicator, and/or other fields or values. In some embodiments, the translation vector can be provided by or sent from a processor or software module. A translation entry can then be selected from a group of translation entries, at 620, based on a portion of the translation vector. In other words, a translation entry related to the translation vector can be accessed, at 620. For example, a translation entry can be selected from a group of translation entries based on a virtual memory identifier of the translation vector. The selection can include a lookup in a CAM based on the virtual memory identifier or some other value or field from the translation vector. In some embodiments, the selection can include computing a hash value based on the virtual memory identifier, and using that has value as an index into a table (e.g., stored at a memory or database) to access a translation entry. In some embodiments, other selection methods or processes can also be used.

If a translation entry related to the translation vector cannot be located or is not available, at 620, an error signal can be sent, at 680. This process can be referred to as a memory translation miss. In other words, if a translation entry related to the translation vector has not been registered or stored, or has been unregistered or removed from a table (e.g., at a memory), a error signal can be provided to a processor, software module, or hardware module.

After a translation entry related to the translation vector (or related to a value or field such as a virtual memory identifier of the translation vector) is selected, the access class of that translation entry can be determined, at 630. In other words, an access class indicator can define or describe the access class to which the translation entry is related. Said differently, the access class indicator can describe whether the memory location referenced by the physical memory identifier of the translation entry can be accessed by a single process (a process access class or process class), a group of processes (a group access class or group class), a group of groups of processes (a group access class or group class), or some other set or subset of processes and/or hardware modules. For example, a shared indicator stored within the translation entry can be accessed to determine whether the translation entry is related to a single process, a group of processes, or a group of groups of processes. In some embodiments, a translation vector can include an access class indicator. For example, a processor can store a list or table of access class indicators associated with virtual memory identifiers and can include the access class indicator associated with a virtual memory identifier within the translation vector.

If the translation entry is related to a process access class, an access identifier of the translation entry can be compared with a process identifier of the translation module, at 640. If the translation entry is related to a group access class, an access identifier of the translation entry can be compared with a group identifier of the translation module, at 650. If the access identifier is related to (or matches) the group identifier or the process identifier, at 660, the physical memory identifier of the translation entry can be sent or provided to, for example, a processor, software module, and/or hardware module, at 670. The processor can then access a portion of a memory based on the physical memory identifier.

If the access identifier is not related to (or does not match) the group identifier or the process identifier, at 660, an error signal can be sent or provided to, for example, a processor, software module, and/or hardware module, at 680. The processor, software module, and/or hardware module can handle (or process) the error signal in various ways. For example, if the error signal is sent because the access identifier is not related to the group identifier or the process identifier, at 660, the processor, software module, and/or hardware module can raise an exception or interrupt indicating an attempted unauthorized memory access. Similarly, if the error signal is sent because a translation entry related to the translation vector is not available, at 620, the processor, software module, and/or hardware module can raise an exception or interrupt and/or trigger execution of a page table walk to move a data or information stored at a secondary storage memory (e.g., non-volatile storage such as a hard disk) to primary storage memory (e.g., a RAM module). The processor, software module, and/or hardware module can then update a translation module or a memory of a translation module based on the moved data, and process 600 can be repeated.

In some embodiments, process 600 can include more or fewer steps than illustrated in FIG. 6, and/or steps can be rearranged. In some embodiments process 600 includes additional steps to determine whether a particular type of access to a memory location referenced by a physical memory identifier of a translation entry is allowed or authorized. For example, a translation vector can include an access type indicator associated with a particular type of access such as, for example, read access, write access and/or execute access, and a translation entry can include an access permissions field including an indicator or value associated with a type of access allowed for the memory location referenced by the physical memory identifier of the translation entry. If the type of access requested (e.g., indicated by the access type indicator) is related to or matches the type of access allowed by the access permissions field, the physical memory identifier can be sent. If the type of access requested is not related to the type of access allowed by the access permissions field, an error signal can be sent. Additionally, in some embodiments, if a translation entry is selected, at 620, the translation entry or a physical memory identifier of the translation entry can be sent to a processor (or software module or hardware module), and the processor can determine an access class of the translation entry, and/or whether the process requesting access to the memory location referenced by the translation entry is authorized to access that memory location.

In some embodiments, as illustrated in FIG. 4, a translation entry can include multiple access identifiers. A group identifier and a process identifier can each be compared with one or more access identifiers to determine whether access to a portion of a memory is allowed. For example, a first access identifier can be associated with a process identifier and a second access identifier can be associated with a group identifier. If either of a process identifier of the translation vector matches the first access identifier or a group identifier of the translation vector matches the second access identifier, access to the portion of the memory referenced by the physical memory identifier of the translation entry can be allowed at the physical memory identifier sent, at 670. Thus, in some embodiments, process 600 does not determine a translation entry class.

In some embodiments, one type (or group of types) of access to a portion of a memory can be allowed if a process identifier of the translation vector matches an access identifier of the translation entry that is associated with a process identifier, and another type (group of types) of access to a portion of the memory if a group identifier of the translation vector matches another an access identifier of the translation entry that is associated with a group identifier. For example, if a translation entry is of a group class (e.g., a shared indicator of the translation entry indicates a group access class), both a process identifier and a group identifier of the translation vector can be compared with respective access identifier of the translation entry. If the group identifier matches the access identifier associated with a group identifier, read access can be allowed. If the group identifier matches the access identifier associated with a group identifier and the process identifier matches the access identifier associated with a process identifier, read access, write access and execute access can be allowed. If the group identifier does not match the access identifier associated with a group identifier and the process identifier matches the access identifier associated with a process identifier, an error signal can be generated.

Figure 7:
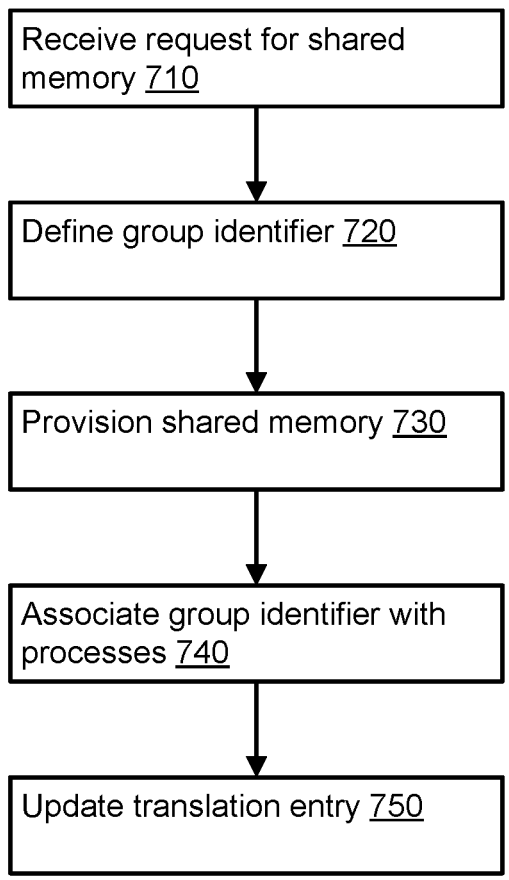
FIG. 7 is a flowchart of a process for providing access to a shared portion of a memory, according to an embodiment.

FIG. 7 is a flowchart of process 700 for providing access to a shared portion of a memory, according to an embodiment. Method 700 can be implemented, for example, as a software module (e.g., source code, object code, one or more scripts, or instructions) stored at a memory and operable to be executed and/or interpreted or compiled at a processor operatively coupled to the memory at a computing device. For example, processor-executable instructions stored at a memory of a computing device can be executed at a processor at the computing device to cause the processor to execute the steps of method 700. In some embodiments, method 700 can be implemented as one or more hardware modules such as, for example, an ASIC, an FPGA, a processor, or other hardware module at a computing device. In some embodiments, method 700 can be implemented as a combination of one or more hardware modules and software modules at a computing device.

A request for a shared portion of a memory is received, at 710. For example, a software module hosted at a processor can request a shared portion of a memory by sending one or more signals (e.g., interrupts or system calls) to an operating system or other software module. In other embodiments, a hardware module can request a shared portion of a memory by sending signals to another hardware module such as a memory management module or a processor hosting an operating system configured to manage the memory. A group identifier can be defined, at 720, and a portion of the memory provisioned to be shared, at 730, in response to the request for shared memory.

The group identifier can be, for example, an integer or other identifier that can be associated with software modules (e.g., processes) and/or hardware modules that have requested access to the shared portion of the memory. For example, an operating system can set a field within a process control block of a software module to have a value equal or related to a value of the group identifier. The operating system can provide the group identifier and, in some embodiments, a process identifier uniquely associated with that software module to a translation module when that software module requests access to a memory location. In other embodiments, the group identifier can be assigned or provided to a hardware module and provided to a translation module when that hardware module requests access to a memory location.

The shared portion of the memory can be provisioned by selecting an available portion of a memory from a memory map such as, for example, a memory bitmap or memory heap, and marking that memory as in use or reserved. In some embodiments, provisioning a shared portion of the memory can include moving a data set from a portion of the memory (e.g., primary storage memory such as RAM) to another memory (e.g., secondary storage such as a hard disk). Additionally, a virtual memory identifier can be used by software modules and/or hardware modules allowed to access the shared portion of the memory can be defined or selected, at 730. For example, a virtual memory identifier can be provided to software modules that are allowed to access the shared portion of the memory, and those software modules can provide that virtual memory identifier to a translation module (e.g., via a processor at which those software modules are hosted) to request a physical memory identifier that references the shared portion of the memory. In some embodiments, other provisioning can occur, at 730.

After the group identifier is defined and the shared portion of the memory is provisioned, the group identifier can be associated with the processes (or software modules) that will access the shared portion of the memory, at 740. In other words, the group identifier can be assigned or distributed to the software modules that are authorized or allowed to access the shared memory. For example, an operating system can assign the group identifier to a field in a process control block of each software module and/or hardware module that is allowed to access the shared portion of the memory. In some embodiments, a memory management module can provide or assign the group identifier to each hardware module and/or software module that is allowed to access the shared portion of the memory.

A translation entry associated with the shared portion of the memory can then be updated, at 750. For example, hardware modules and/or software modules that are allowed to access the shared portion of the memory can reference the shared portion of the memory based on a virtual memory identifier. That virtual memory identifier and a physical memory identifier (i.e., the memory location of the physical memory that is shared) can be stored at a translation entry of a translation module. Additionally, the group identifier of the group of software modules and/or hardware modules that are allowed to access the shared portion of the memory can be stored as an access identifier at the translation entry of the translation module. In some embodiments, a shared indicator can also be stored at the translation entry of the translation table to indicate that the access identifier is related to a group identifier rather than, for example, a process identifier. Subsequent requests for access to the shared memory based on a virtual memory identifier can be processed as described above, for example, in relation to FIG. 6.

In some embodiments, process 700 can include more or fewer steps than illustrated in FIG. 7, and/or steps can be rearranged. For example, in some embodiments, a shared portion of a memory can previously have been provisioned and a group identifier can have been previously defined. Thus, steps 720 and 730 can be omitted, and the group identifier can be associated with a software module or hardware module requesting access to the shared portion of the memory. In some embodiments, the translation entry related to the shared portion of the memory is not updated. Additionally, in some embodiments, updating the translation entry related to the shared portion of the memory includes updating an access type field of the translation entry. For example, the request for a shared portion of the memory (or access to the shared portion of the memory) can include an access type indicator (e.g., read access, write access, and/or execute access). An access type field of the translation entry can be updated (e.g., a value of the access type field) can be changed to limit access to particular type of access. In other words, access permissions and/or restrictions can be defined or updated.

Figure 8:
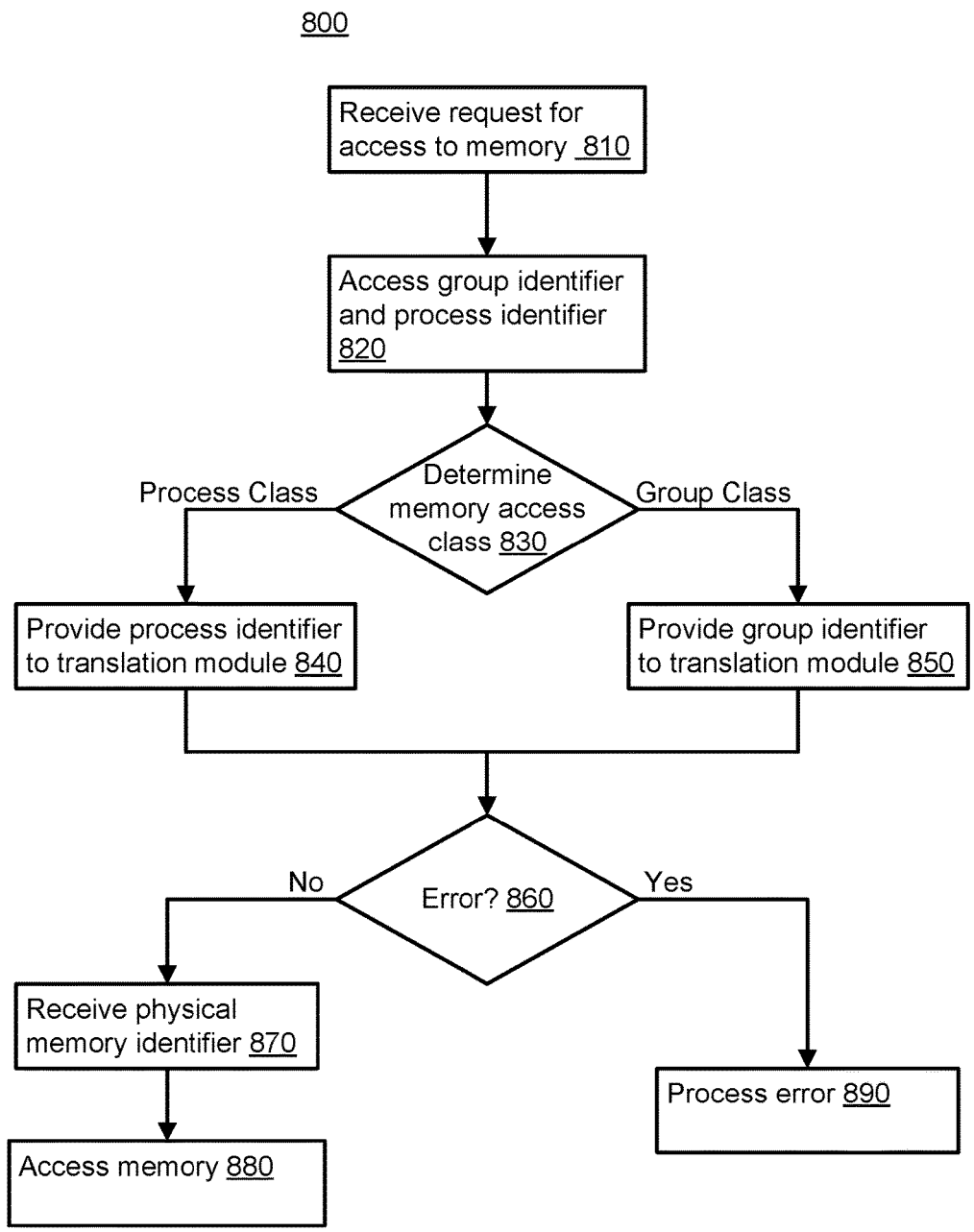
FIG. 8 is a flowchart of a process for accessing a shared portion of a memory, according to an embodiment.

FIG. 8 is a flowchart of process 800 for accessing a shared portion of a memory, according to an embodiment. Method 800 can be implemented, for example, as a software module (e.g., source code, object code, one or more scripts, or instructions) stored at a memory and operable to be executed and/or interpreted or compiled at a processor operatively coupled to the memory at a computing device. For example, processor-executable instructions stored at a memory of a computing device can be executed at a processor at the computing device to cause the processor to execute the steps of method 800. In some embodiments, method 800 can be implemented as one or more hardware modules such as, for example, an ASIC, an FPGA, a processor, or other hardware module at a computing device. In some embodiments, method 800 can be implemented as a combination of one or more hardware modules and software modules at a computing device.

A request for access to a portion of a memory is received, at 810. For example, a software module hosted at a processor can request access to a portion of a memory by sending one or more signals (e.g., interrupts or system calls) to an operating system or other software module. In other embodiments, a hardware module can request access to a portion of a memory by sending signals to another hardware module such as a memory management module or a processor hosting an operating system configured to manage the memory. In some embodiments, the request for access to the memory can include a virtual memory identifier that is provided to a translation module.

A group identifier and a process identifier can be accessed, at 820. For example, a group identifier and a process identifier can be included within fields of a process control block of a software module hosted at a processor, and an operating system can access the group identifier and process identifier. In some embodiments, a group identifier and a process identifier can be stored at a hardware module, and that hardware module can provide the group identifier and process identifier to another hardware module (e.g., a memory management module) and/or the operating system. Thus, in some embodiments, a process identifier can be a device identifier uniquely associated with a hardware module. In some embodiments, a software module and an operating system can be hosted and different processors (e.g., the operating system and software module can be part of a distributed computing system), and the software module can provide the process identifier and the group identifier (e.g., via a communications network) to the operating system or a memory management module (software and/or hardware module) operatively coupled to the operating system.

The access class of the portion of the memory accessed is determined, at 830. For example, an operating system or memory management module can store a table of memory access classes (e.g., group access or process access) at a table within a memory accessible to the operating system or memory management module. In some embodiments, a translation module can be accessed to determine a memory access class. For example, a request for access to a memory can include a virtual memory identifier, and that virtual memory identifier can be provided to the translation module. The translation module can select a translation entry including a shared indicator related to the virtual memory identifier (e.g., as discussed above). The translation module can provide the shared indicator to an operating system or memory management module, and the operating system or memory management module can determine the memory access class based on the shared indicator.

If the memory access class is a process class, the process identifier can be provided to a translation module, at 840. If the memory access class is a group class, the group identifier is provided to the translation module, at 850. The translation module can determine whether access to the portion of the memory is allowed or authorized based on the process identifier or group identifier and a virtual memory identifier (e.g., as discussed above).

If an error occurs, at 860, the error can be processed by the operating system of memory management module, at 890. For example, an error can occur if a memory translation miss occurs, a group identifier or process identifier is not related to an access identifier of a translation entry associated with the portion of the memory to which access is requested, and/or a type of access is request that is not permitted for the portion of the memory to which access is requested based on an access type field of the associated translation entry. The operating system of memory management module can receive the error and perform a page table walk, generate or raise an interrupt or exception, and/or trigger some other software module to handle the error.

If an error does not occur (e.g., a memory translation miss does not occur and the requested access to the portion of the memory is allowed), at 860, a physical memory identifier can be received, at 870. In other words, the translation module can send a physical memory identifier referencing the portion of the memory to which access was requested. The physical memory identifier can then be used to access the portion of the memory, at 880. In some embodiments, the portion of the memory can be accessed by the operating system or memory management module, and the contents (e.g., data) at that portion of the memory can be provided to the software module or hardware module that requested access to the portion of the memory. In some embodiments, the physical memory identifier can be provided to the software module or hardware module that requested access to the portion of the memory, and that software module or hardware module can access the portion of the memory.

In some embodiments, process 800 can include more or fewer steps than illustrated in FIG. 8, and/or steps can be rearranged. For example, in some embodiments, a memory access class is not determined by process 800. The process class and the group class can be provided to the translation module, and the translation module can determine the memory access class and compare the appropriate identifier (i.e., the process identifier or the group identifier) with an access identifier of a translation entry related to the portion of the memory to which access is requested. Additionally, in some embodiments, process 800 can include determining whether a particular type of access is permitted or allowed. For example, a value of an access type filed of a translation entry related to the portion of the memory to which access is requested can be provided to an operating system or memory management module, and that operating system or memory management module can determine whether the requested type of access is permitted before providing the process identifier or the group identifier to the translation module.

It is intended that the methods and services described herein can be performed by software, hardware, or a combination thereof. Hardware modules may include, for example, a general-purpose processor, a field programmable gate array (FPGA), and/or an application specific integrated circuit (ASIC). Software modules can be expressed in a variety of software languages (e.g., computer code), including C, C++, Java™, Ruby, Visual Basic™ and other object-oriented, procedural, or other programming language and development tools. Examples of computer code include, but are not limited to, micro-code or micro-instructions, machine instructions, such as produced by a compiler, and files containing higher-level instructions that are executed by a computer using an interpreter. Additional examples of computer code include, but are not limited to, control signals, encrypted code, and compressed code. Although a few embodiments have been shown and described, it will be appreciated that various changes and modifications might be made.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as application-specific integrated circuits (ASICs), Programmable Logic Devices (PLDs), and Read-Only Memory (ROM) and Random-Access Memory (RAM) devices.

While various embodiments have been described above, it should be understood that they have been presented by way of example only, not limitation, and various changes in form and details may be made. For example, although described in relation to a switch fabric, embodiments disclosed herein are applicable to any computing device in which memory can be shared between two or more software modules and/or hardware modules. Additionally, embodiments described in relation to software modules are generally applicable to hardware modules; and embodiments described in relation to hardware modules are generally applicable to software modules. Any portion of the apparatus and/or methods described herein may be combined in any combination, except mutually exclusive combinations. The embodiments described herein can include various combinations and/or sub-combinations of the functions, components and/or features of the different embodiments described. Furthermore, each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An apparatus, comprising:
    a memory; and
    a processor operatively coupled to the memory, the processor configured to select a translation entry from a plurality of translation entries based on a translation vector associated with a process from a plurality of processes, the translation vector including a first identifier associated with the process from the plurality of processes and a second identifier uniquely associated with the plurality of processes, each translation entry from the plurality of translation entries including an access class and a physical memory identifier,
    the processor configured to determine if the access class of the translation entry is associated with the first identifier of the translation vector or the second identifier of the translation vector,
    the processor configured to send a signal associated with a physical memory identifier of the translation entry if the access class of the translation entry matches the first identifier of the translation vector or the second identifier of the translation vector.

2. The apparatus of claim 1, wherein:
    the translation vector includes a virtual memory identifier of the translation vector,
    the translation entry includes a virtual memory identifier of the translation entry, and
    the processor is configured to select the translation entry from the plurality of translation entries based on the virtual memory identifier of the translation vector being associated with the virtual memory identifier of the translation entry.

3. The apparatus of claim 1, wherein:
    the translation vector includes a virtual memory identifier of the translation vector,
    the processor is configured to define a hash value based on the virtual memory identifier of the translation vector, and the processor is configured to select the translation entry from the plurality of translation entries based on the hash value.

4. The apparatus of claim 1, wherein:
    the translation vector includes an access type associated with the process from the plurality of processes,
    the translation entry includes an access type permission,
    the processor is configured to determine if the access type permission of the translation entry allows the access type of the translation vector,
    the processor is configure to send the signal associated with the physical memory identifier of the translation entry if the access type permission of the translation entry allows the access type of the translation vector.

5. The apparatus of claim 1, wherein:
    the translation entry includes a shared indicator,
        the shared indicator being a first value when the access class of the translation entry is associated with a process class of memory access,
        the shared indicator being a second value different from the first value when the access class of the translation entry is associated with a group class of memory access,
    the processor is configured to determine if the access class of the translation entry is associated with the first identifier of the translation vector when the shared indicator is the first value,
    the processor is configured to determine if the access class of the translation entry is associated with the second identifier of the translation vector when the shared indicator is the second value.

6. The apparatus of claim 1, wherein:
    the processor is configured to send an error signal if the access class of the translation entry does not match the first identifier of the translation vector or the second identifier of the translation vector.

7. The apparatus of claim 1, wherein:
    the processor is configured to receive the translation vector from a compute device within a distributed switch fabric,
    the processor is configured to define a transmission path within the distributed switch fabric based on a data set stored at a memory location associated with the physical memory identifier of the translation entry, and
    the processor is configured to send the data set to the compute device via the transmission path.

8. The apparatus of claim 1, wherein:
    the translation entry includes a field associated with whether a portion of a memory identified by the physical memory identifier has been changed since an earlier event.

9. The apparatus of claim 1, wherein:
    the translation entry includes a field associated with whether a portion of a memory identified by the physical memory identifier is allowed to be swapped to a secondary memory storage.

10. The apparatus of claim 1, wherein:
    the access class of the translation entry includes a process access class and a group access class,
    the processor is configured to determine if the process access class of the translation entry is associated with the first identifier of the translation vector,
    the processor is configured to send the signal associated with the physical memory identifier of the translation entry if the process access class of the translation entry matches the first identifier of the translation vector.

11. The apparatus of claim 1, wherein:
the access class of the translation entry includes a process access class and a group access class,
the processor is configured to determine if the group access class of the translation entry is associated with the second identifier of the translation vector,
the processor is configured to send the signal associated with the physical memory identifier of the translation entry if the group access class of the translation entry matches the second identifier of the translation vector.

12. A method, comprising:
receiving a request to access a portion of a memory associated with a process from a plurality of processes, the request including a translation vector having a first identifier associated with the process from the plurality of processes, a second identifier uniquely associated with the plurality of processes, and a virtual memory identifier;
selecting a translation entry from a plurality of translation entries based on the virtual memory identifier of the translation vector, each translation entry from the plurality of translation entries including an access class and a physical memory identifier;
determining if the access class of the translation entry is associated with the first identifier of the translation vector or the second identifier of the translation vector; and
sending a signal associated with a physical memory identifier of the translation entry associated with the portion of the memory if the access class of the translation entry matches the first identifier of the translation vector or the second identifier of the translation vector.

13. The method of claim 12, wherein:
each translation entry from the plurality of translation entries includes a virtual memory identifier of that translation entry,
the selecting the translation entry from the plurality of translation entries is based on the virtual memory identifier of the translation vector matching the virtual memory identifier of that translation entry.

14. The method of claim 12, further comprising:
defining a hash value based on the virtual memory identifier of the translation vector,
the selecting the translation entry from the plurality of translation entries is based on the hash value.

15. The method of claim 12, wherein:
the translation vector includes an access type associated with the process from the plurality of processes,
the translation entry includes an access type permission, the method further comprising:
determining if the access type permission of the translation entry allows the access type of the translation vector,
sending the single associated with the physical memory identifier of the translation entry if the access type permission of the translation entry allows the access type of the translation vector.

16. The method of claim 12, wherein:
the translation entry includes a shared indicator,
the shared indicator being a first value when the access class of the translation entry is associated with a process class of memory access,
the shared indicator being a second value different from the first value when the access class of the translation entry is associated with a group class of memory access,
the method further comprising:
determining if the access class of the translation entry is associated with the first identifier of the translation vector when the shared indicator is the first value,
determining if the access class of the translation entry is associated with the second identifier of the translation vector when the shared indicator is the second value.

17. The method of claim 12, further comprising:
sending an error signal if the access class of the translation entry does not match the first identifier of the translation vector or the second identifier of the translation vector.

18. The method of claim 12, further comprising:
receiving the request from a compute device within a distributed switch fabric;
defining a transmission path within the distributed switch fabric based on a data set stored at the portion of the memory; and
sending the data set to the compute device via the transmission path.

19. The method of claim 12, wherein:
the access class of the translation entry includes a process access class and a group access class,
the method further comprises:
determining if the process access class of the translation entry is associated with the first identifier of the translation vector,
sending the signal associated with the physical memory identifier of the translation entry if the process access class of the translation entry matches the first identifier of the translation vector.

20. An apparatus, comprising:
a memory; and
a processor operatively coupled to the memory,
the processor configured to define a group identifier associated with a shared memory accessible to a first process and a second process,
the processor configured to define a first process identifier uniquely associated with the first process and define a second process identifier uniquely associated with the second process,
the processor configured to provision the shared memory and define a virtual memory identifier associated with a physical memory identifier that is associated with the shared memory,
the processor configured to store the group identifier, the first process identifier, the second process identifier, the virtual memory identifier, and the physical memory identifier, at a translation entry at the memory,
the processor configured to receive a request from the first process for access to the shared memory,
the processor configured to send the physical memory identifier to the first process.

* * * * *